United States Patent
Kwak et al.

(10) Patent No.: US 10,388,951 B2
(45) Date of Patent: Aug. 20, 2019

(54) COMPOSITE ANODE ACTIVE MATERIAL, LITHIUM BATTERY INCLUDING THE SAME, AND METHOD OF PREPARING THE COMPOSITE ANODE ACTIVE MATERIAL

(71) Applicant: SAMSUNG SDI CO., LTD., Yongin-si, Gyeonggi-do (KR)

(72) Inventors: Jiyeon Kwak, Yongin-si (KR); Youngugk Kim, Yongin-si (KR); Heeseon Choi, Yongin-si (KR); Yeongap Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 307 days.

(21) Appl. No.: 15/263,161

(22) Filed: Sep. 12, 2016

(65) Prior Publication Data
US 2017/0084909 A1    Mar. 23, 2017

(30) Foreign Application Priority Data
Sep. 18, 2015   (KR) .......................... 10-2015-0132602

(51) Int. Cl.
*H01M 4/36*      (2006.01)
*H01M 4/1393*    (2010.01)
(Continued)

(52) U.S. Cl.
CPC .......... *H01M 4/366* (2013.01); *H01M 4/133* (2013.01); *H01M 4/134* (2013.01); *H01M 4/136* (2013.01);
(Continued)

(58) Field of Classification Search
CPC .... H01M 4/1393; H01M 4/366; H01M 4/386; H01M 4/58; H01M 4/583; H01M 4/134;
(Continued)

(56) References Cited

U.S. PATENT DOCUMENTS

2002/0164479 A1   11/2002   Matsubara et al.
2006/0154071 A1    7/2006   Homma et al.
(Continued)

FOREIGN PATENT DOCUMENTS

EP        2960971 A1     12/2015
KR     1995-7004536 A    11/1995
(Continued)

OTHER PUBLICATIONS

EPO Office Action dated Feb. 16, 2018, for corresponding European Patent Application No. 16188848.2 (7 pages).
(Continued)

*Primary Examiner* — Laura Weiner
(74) *Attorney, Agent, or Firm* — Lewis Roca Rothgerber Christie LLP

(57) ABSTRACT

A composite anode active material includes: a core portion including a crystalline carbonaceous material; a shell portion including a plurality of composite particles deposited on at least a portion of the core portion, wherein each of the composite particles includes a metallic core that is alloyable with lithium; and a coating layer including metal nitride on the surface of the metallic core in an island pattern. A lithium battery including the composite anode active material and a method of preparing the composite anode active material are also provided.

12 Claims, 10 Drawing Sheets

(51) Int. Cl.
*H01M 10/0525* (2010.01)
*H01M 4/38* (2006.01)
*H01M 4/58* (2010.01)
*H01M 4/583* (2010.01)
*H01M 4/134* (2010.01)
*H01M 4/136* (2010.01)
*H01M 4/133* (2010.01)
*H01M 4/1395* (2010.01)
*H01M 4/1397* (2010.01)
*H01M 4/587* (2010.01)
*H01M 10/052* (2010.01)

(52) U.S. Cl.
CPC ....... *H01M 4/1393* (2013.01); *H01M 4/1395* (2013.01); *H01M 4/1397* (2013.01); *H01M 4/362* (2013.01); *H01M 4/38* (2013.01); *H01M 4/386* (2013.01); *H01M 4/58* (2013.01); *H01M 4/583* (2013.01); *H01M 4/587* (2013.01); *H01M 10/052* (2013.01); *H01M 10/0525* (2013.01); *Y02T 10/7011* (2013.01)

(58) Field of Classification Search
CPC .... H01M 4/136; H01M 4/133; H01M 4/1395; H01M 4/1397; H01M 4/362; H01M 4/38; H01M 4/587; H01M 10/0525; H01M 10/052

See application file for complete search history.

(56) References Cited

U.S. PATENT DOCUMENTS

2013/0122369 A1  5/2013  Kim et al.
2013/0252031 A1  9/2013  Ma et al.
2015/0147649 A1  5/2015  Jung et al.

FOREIGN PATENT DOCUMENTS

| KR | 10-2005-0057237 A | 6/2005 |
| KR | 10-2009-0109225 A | 10/2009 |
| KR | 10-2010-0062083 A | 6/2010 |
| WO | WO 94/13853 A1 | 6/1994 |
| WO | WO 2014/129594 A1 | 8/2014 |

OTHER PUBLICATIONS

EPO Extended Search Report dated Oct. 24, 2016, for corresponding European Patent Application No. 16188848.2 (9 pages).
EPO Office Action dated Oct. 4, 2018, for corresponding European Patent Application No. 16188848.2 (7 pages).

COMPOSITE ANODE ACTIVE MATERIAL, LITHIUM BATTERY INCLUDING THE SAME, AND METHOD OF PREPARING THE COMPOSITE ANODE ACTIVE MATERIAL

CROSS-REFERENCE TO RELATED APPLICATION

This application claims priority to and the benefit of Korean Patent Application No. 10-2015-0132602, filed on Sep. 18, 2015, in the Korean Intellectual Property Office, the entire content of which is incorporated herein by reference.

BACKGROUND

1. Field

One or more aspects of embodiments of the present disclosure relate to a composite anode active material, a lithium battery including the same, and a method of preparing the composite anode active material.

2. Description of the Related Art

Demands for secondary batteries for use in portable electric devices for information communication, electric bicycles, electric vehicles, and/or the like are rapidly increasing. Examples of such portable electric devices include personal digital assistants (PDAs), mobile phones, and notebook computers. Lithium batteries, and in particular, lithium ion batteries (LIBs) are used as power sources in portable information technology (IT) devices as well as in electric vehicles and for power storage due to their high energy densities and ease of manufacturing. Required properties of LIBs include high energy density and/or long lifespans.

Carbonaceous material, such as graphite, is often used as an anode active material in lithium batteries. However, the use of carbonaceous material such as graphite in high-capacity lithium batteries is limited by its theoretical discharge capacity of about 360 mAh/g.

Lithium-alloyable metal materials such as Si or Sn are attracting attention as anode material alternatives to graphite.

Si has a theoretical capacity of about 4,200 mAh/g. However, when Si is used alone, a volume expansion of about 300% or more may occur during charging and discharging, leading to weak adhesion between the anode current collector and active material, along with a decrease in capacity.

To address this capacity decrease, instead of using a lithium-alloyable metal material such as Si or/and Sn alone, the lithium-alloyable metal material is mixed with a carbonaceous anode active material and/or an alkali metal material to compensate for the anode active material.

However, even when these anode active materials are used, improvements in capacity, lifespan characteristics, and initial efficiency characteristics are often negligible.

Accordingly, there is a need to develop an anode active material with further improved initial efficiency, charge and discharge capacity, and lifespan characteristics, as well as a lithium battery including the anode active material, and a method of preparing the anode active material.

The above information disclosed in this Background section is included only to enhance understanding of the background of the present disclosure, and may therefore may contain information that does not form the prior art that is already known in this country to a person of ordinary skill in the art.

SUMMARY

Aspects of one or more example embodiments of the present disclosure are directed toward a composite anode active material with improved initial efficiency, charge and discharge capacity, and lifespan characteristics.

Aspects of one or more example embodiments of the present disclosure are directed toward a lithium battery including the composite anode active material.

Aspects of one or more example embodiments of the present disclosure are directed toward a method of preparing the composite anode active material.

Additional aspects will be set forth, in part, in the description which follows and, in part, will be apparent from the description, or may be learned by practice of the presented embodiments.

According to one or more example embodiments, a composite anode active material includes: a core portion including a crystalline carbonaceous material; and a shell portion including a plurality of composite particles on at least a portion of the core portion, each of the composite particles including a metallic core that is alloyable with lithium and a coating layer including metal nitride on the surface of the metallic core in an island pattern.

According to one or more example embodiments, a lithium battery includes: a cathode including a cathode active material; an anode including the composite anode active material; and an electrolyte between the cathode and the anode.

According to one or more example embodiments, a method of preparing a composite anode active material includes: preparing a plurality of composite particles; mixing the composite particles and a crystalline carbonaceous material core portion to obtain a mixture; and drying the mixture to deposit the composite particles on at least a portion of the crystalline carbonaceous material core portion to form a shell portion, wherein each of the composite particles includes a metallic core that is alloyable with lithium, and a coating layer including metal nitride on the surface of the metallic core in an island pattern.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
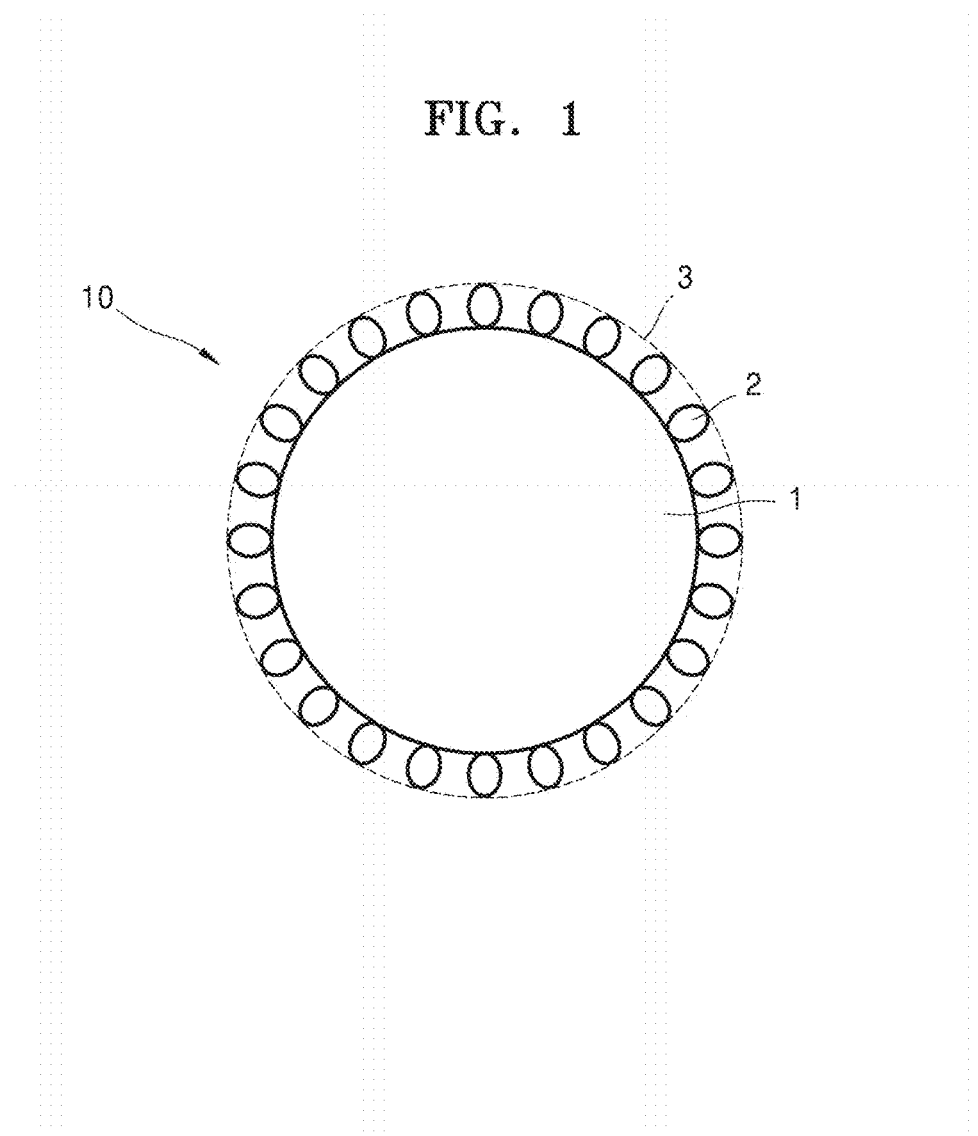
FIG. 1 is a schematic view of a composite anode active material according to an example embodiment.

Reference will now be made in more detail to example embodiments, examples of which are illustrated in the accompanying drawings. In the drawings, like reference numerals refer to like elements throughout, and duplicative descriptions thereof will not be provided. In this regard, the present example embodiments may have different forms and should not be construed as being limited to the descriptions set forth herein. Accordingly, the example embodiments are merely described below, by referring to the drawings, to explain aspects of the present description. As used herein, the term "and/or" includes any and all combinations of one or more of the associated listed items. Expressions such as "at least one of," "one of", "at least one selected from", and "one selected from", when preceding a list of elements, modify the entire list of elements and do not modify the individual elements of the list.

In the drawings, the thickness of layers, films, panels, regions, etc., may be exaggerated for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

A composite anode active material according to an example embodiment of the present disclosure, a lithium battery including the composite anode active material, and a method of preparing the composite anode active material will each be described below. However, these descriptions are provided herein as examples only, and do not limit the scope of the present disclosure.

An aspect of an embodiment of the present disclosure provides a composite anode active material including: a core portion including a crystalline carbonaceous material; and a shell portion including a plurality of composite particles on at least a portion of the core portion, each of the composite particles including a metallic core that is alloyable with lithium and a coating layer including metal nitride on the surface of the metallic core in an island pattern.

FIG. 1 is a schematic view of a composite anode active material 10 according to an example embodiment.

The composite anode active material 10 according to an embodiment of the present disclosure includes a crystalline carbonaceous material core portion 1 and an overall shell portion 3, which includes a plurality of composite particles 2 deposited on the crystalline carbonaceous material core portion 1.

The composite anode active material 10 may be envisioned as including a core portion, a middle portion, and a coating portion. The core portion may correspond to the portion of the composite that includes the crystalline carbonaceous material 1, the middle portion may correspond to the cores of each of the composite particles 2 within the overall shell portion 3, and the coating portion may correspond to the coatings on each of the composite particles 2 within the overall shell portion 3. In more detail, the core portion may correspond to the crystalline carbonaceous material, the middle portion may correspond to the metallic core that is alloyable with lithium, and the coating may correspond to the coating layer including metal nitride.

The core portion including the crystalline carbonaceous material may form the frame of the composite anode active material, and may act as an electrically conductive channel. The middle portion, that is, the metallic core that is alloyable with lithium, may retain the bulk of the battery capacity.

The coating portion, that is, the coating layer including metal nitride, may suppress an excessive volume expansion of the middle portion (e.g., the metallic core that is alloyable with lithium), and a side reaction with an electrolyte, thereby leading to an improvement in lifespan characteristics. On the surface of the middle portion (e.g., the metallic core that is alloyable with lithium), the coating layer including metal nitride may be formed in an island pattern. As used herein, the term "island pattern" refers to a structure in which islands of the material are arranged in a substantially discontinuous manner at set (e.g., predetermined intervals). When the coating layer including metal nitride is formed in an island pattern on the surface of the metallic core, the diffusion of lithium ions between the electrolyte and the composite particles is not interrupted during charging and discharging. Accordingly, the composite anode active material may have improved initial efficiency, charge and discharge capacity, and lifespan characteristics. However, when the coating portion of the coating layer including metal nitride is substantially continuous on the surface of the middle portion (e.g., the metallic core that is alloyable with lithium), the lithium battery including the composite anode active material may not have a high capacity.

The particles formed of the metallic core that is alloyable with lithium may be spherical or oval in shape. The shape of the metallic core can be identified in a scanning electron microscope (SEM) photograph. When the metallic core is spherical or oval, the initial efficiency of the composite anode active material may be improved.

The average particle diameter of the metallic core may be in a range of 1 μm to 10 μm. In some embodiments, the average particle diameter of the metallic core may be in a range of 5 μm to 10 μm. In some embodiments, the average particle diameter of the metallic core may be in a range of 7 μm to 10 μm.

The metallic core that is alloyable with lithium may include at least one element selected from silicon (Si), tin (Sn), germanium (Ge), antimony (Sb), aluminum (Al), lead (Pb), gallium (Ga), indium (In), cadmium (Cd), silver (Ag), mercury (Hg), and zinc (Zn). In some embodiments, the metallic core that is alloyable with lithium may include at least one element selected from silicon, tin, germanium, and antimony. When the metallic core has the above average particle diameter ranges, the composite anode active material including the metallic core may have a greater specific surface area and higher capacity.

The amount of the metallic core that is alloyable with lithium may be in a range of 10 parts by weight to 60 parts by weight based on 100 parts by weight of the composite particles, and in some embodiments, 25 parts by weight to 55 parts by weight based on 100 parts by weight of the composite particles. When the metallic core that is alloyable with lithium is present in these amounts, the composite anode active material including the metallic core may have better (e.g., improved) charge and discharge characteristics and lifespan characteristics.

The metal nitride may include at least one nitride selected from titanium (Ti), vanadium (V), scandium (Sc), chromium (Cr), manganese (Mn), iron (Fe), nickel (Ni), cobalt (Co), yttrium (Y), zirconium (Zr), niobium (Nb), molybdenum (Mo), ruthenium (Ru), rhodium (Rh), tantalum (Ta), palladium (Pd), tungsten (W), osmium (Os), iridium (Ir), gold (Au), and platinum (Pt). The metal nitride may be stable against reaction with an electrolyte. The metal nitride may suppress side reactions with electrolyte to improve the lifespan characteristics.

The core portion may include at least one crystalline carbonaceous material selected from artificial graphite, natural graphite, carbon fiber, and mesocarbon microbeads (MCMB). The core portion may be spherical, and may include a carbonaceous material having one or more layered-structures obtained from graphite, expansion graphite, or graphene. The term "spherical" as used herein may include a perfect spherical shape, a substantially spherical shape, and an oval shape that is very similar thereto. The average particle diameter of the carbonaceous core portion may be, for example, in a range of 1 µm to 80 µm. In some embodiments, the average particle diameter of the carbonaceous core portion may be in a range of 2 µm to 70 µm. In some embodiments, the average particle diameter of the carbonaceous core portion may be in a range of 3 µm to 60 µm. A carbonaceous material having these average particle diameter ranges may provide a channel having excellent electrical conductivity.

Figure 3A:
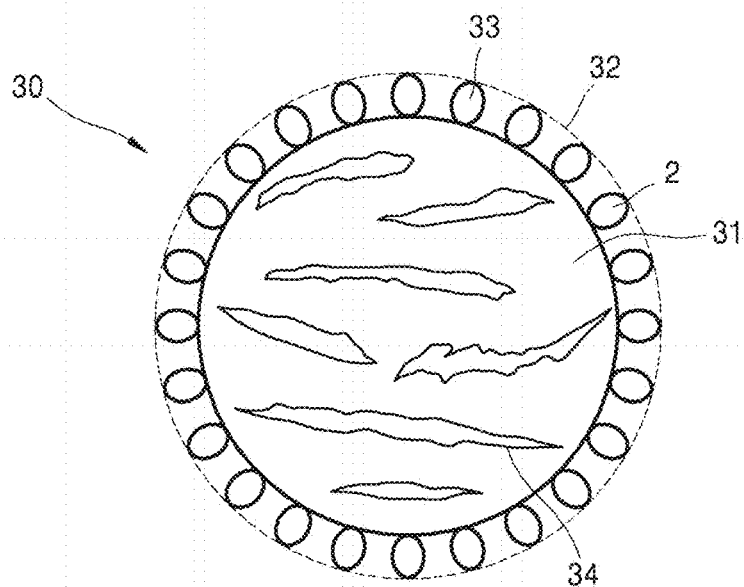
FIG. 3A is a schematic view of a composite anode active material according to an example embodiment.

FIG. 3A is a schematic view of a composite anode active material 30 according to an example embodiment.

The composite anode active material 30 according to the present embodiment includes a crystalline carbonaceous material core portion 31 and a shell portion 32. The crystalline carbonaceous material core portion 31 may have a plurality of pores 34, which are formed due to widened interlayer intervals in the crystalline carbonaceous material. Composite particles 33 may be deposited in at least one of the pores 34. The composite particles 33 may be deposited on the crystalline carbonaceous material core portion 31 and may form the shell portion 32, providing improved initial efficiency, charge and discharge capacity, and lifespan characteristics.

Regarding the composite anode active material, the weight ratio of the crystalline carbonaceous material core portion to the composite particles may be in a range of 60:40 to 80:20. When the weight ratio of the crystalline carbonaceous material core portion to the composite particles is within this range, the composite anode active material may suppress direct reactions between Si and the electrolyte solution, thereby providing a stable long lifespan, and Si/TiN may suppress the volume expansion of the composite anode active material.

Figure 2A:
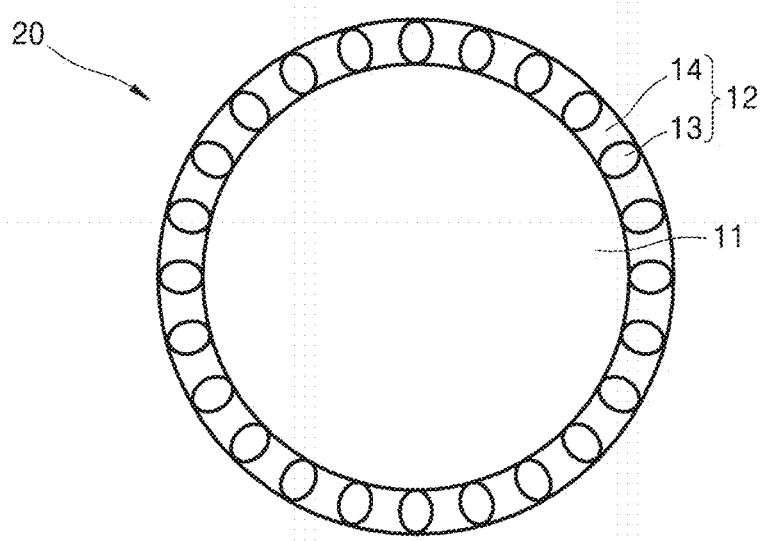
FIG. 2A is a schematic view of a composite anode active material according to an example embodiment.
Figure 2B:
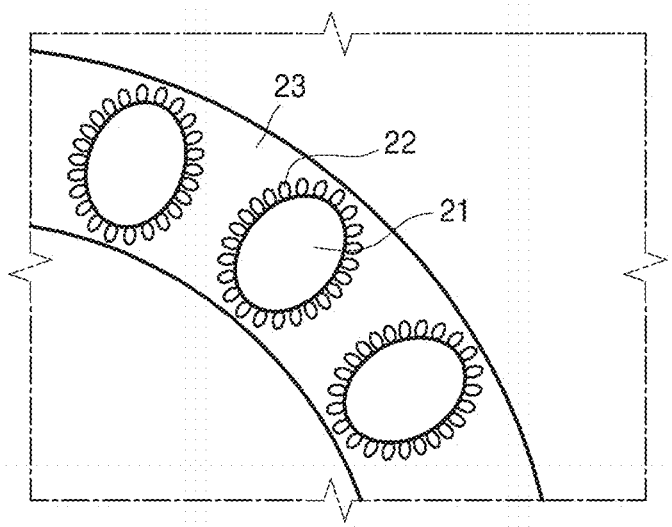
FIG. 2B is an enlarged schematic view of the shell portion illustrated in FIG. 2A.

According to another embodiment of the present disclosure, FIG. 2A is a schematic view of the composite anode active material 20, and FIG. 2B is an enlarged schematic view of the shell portion 12 illustrated in FIG. 2A. Referring to FIGS. 2A and 2B, the composite anode active material 20 includes metallic particles 13 and 21 in addition to amorphous carbonaceous coating layers 14 and 23 on the surface of the composite particles 11, which together form the shell portion 12 (corresponding to overall shell portion 3 of the composite anode active material 10 of FIG. 1). The amorphous carbonaceous coating layers 14 and 23 may entirely coat the surface of the composite particles 11. The coating layer 22 including metal nitride may be on the metallic particles 21 in an island pattern.

Figure 3B:
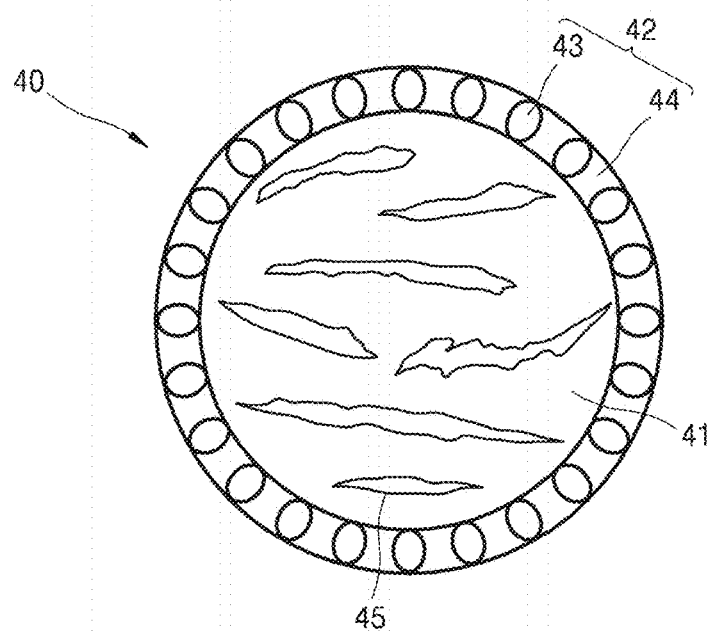
FIG. 3B is a schematic view of a composite anode active material according to an example embodiment.

FIG. 3B is a schematic view of a composite anode active material 40 according to an example embodiment. Referring to FIG. 3B, the composite anode active material 40 includes an amorphous carbonaceous coating layer 44 (see 14 of FIG. 2A) and composite particles 43 on the surface of the crystalline carbonaceous material core portion 41 and within the shell portion 42 (corresponding to shell portion 12 of the composite anode active material 20 of FIG. 2A). The amorphous carbonaceous coating layers 14 and 44 may entirely coat the surface of the composite particles 43 having a core-shell structure. The crystalline carbonaceous material core portion 41 may have a plurality of pores 45, which are formed due to widened interlayer intervals in the crystalline carbonaceous material.

The amorphous carbonaceous coating layers 14, 23, and 44 may be, for example, a pitch coating layer or a coke coating layer. The source material for a pitch coating layer may be selected from a petroleum-based material, a coal-based material, a coal-tar pitch, a petroleum pitch, an organic synthetic pitch obtained by polymerization and condensation of a condensed polycyclic aromatic hydrocarbon compound, and an organic synthetic pitch obtained by polymerization and condensation of a heteroatom-containing condensed polycyclic aromatic hydrocarbon compound. However, the source material for a pitch coating layer is not limited thereto, and may be any material that is available for a pitch coating layer in the art.

The amount of amorphous carbonaceous material for the amorphous carbonaceous coating layers 14, 23, and 44 may be in a range of about 2 parts by weight to about 40 parts by weight based on 100 parts by weight of the composite particles, and in some embodiments, in a range of about 2 parts by weight to about 30 parts by weight based on 100 parts by weight of the composite particles, and in some embodiments, in a range of about 20 parts by weight to about 40 parts by weightbased on 100 parts by weight of the composite particles. When the amorphous carbonaceous material is present in these amounts, the composite anode active material having a shell portion including the amorphous carbonaceous material may have increased electric conductivity.

Another aspect of embodiments of the present disclosure provides a lithium battery having a cathode including a cathode active material, an anode including the composite anode active material described above, and an electrolyte between the cathode and the anode.

An example method of manufacturing the anode of the lithium battery will be described below.

The anode may be manufactured using an anode active material composition prepared by mixing an anode active material, a binder, and a solvent. In some embodiments, the anode active material composition for the anode may further include a conductive material. The anode may be manufactured by directly coating and drying the anode active material composition on a copper current collector to form an anode active material layer. In some embodiments, the anode active material composition may be cast on a separate support, and then a film exfoliated from the separate support may be laminated on a copper current collector to form an anode active material layer.

The composite anode active material described above may be used as the anode active material. Other anode active materials such as lithium metal, lithium-alloyable metal, transition metal oxide, any material that enables doping or de-doping of lithium, or any material that reversibly enables the intercalation and deintercalation of lithium ions may also be used.

Examples of the transition metal oxide may include vanadium oxide, lithium vanadium oxide, and the like. Examples of the material that enables doping or de-doping of lithium may include Si, $SiO_x$ ($0<x<2$), Sn, $SnO_2$, Sn—Y' (wherein Y' is alkali metal, alkali earth metal, Groups 13 to 16 elements, transition metal, a rare-earth element, or a combination thereof, and Y' is not Sn), and a mixture of at least one of these materials and $SiO_2$. In the above formula, Y' may be magnesium (Mg), calcium (Ca), strontium (Sr), barium (Ba), radon (Ra), Sc, Y, Ti, Zr, hafnium (Hf), rutherfordium (Rf), V, Nb, Ta, dubnium (Db), Cr, Mo, W, seaborgium (Sg), technetium (Tc), rhenium (Re), bohrium (Bh), Fe, Pb, Ru, Os, hassium (Hs), Rh, Ir, Pd, Pt, Cu, Ag, Au, Zn, Cd, boron (B), aluminum (Al), Ga, Sn, In, Ge, phosphorus (P), arsenic (As), antimony (Sb), bismuth (Bi), sulfur (S), selenium (Se), tellurium (Te), polonium (Po), or a combination thereof. As used herein, the terms "combination", "combination thereof" and "combinations thereof" may refer to a chemical combination (e.g., an alloy or chemical compound), a mixture, or a laminated structure of components.

The material that reversibly enables the intercalation and deintercalation of lithium ions may be a carbonaceous material, and may be any carbonaceous material that is suitable for use in a lithium battery. Examples of the carbonaceous material may include crystalline carbon, amorphous carbon, and a combination thereof. Examples of the crystalline carbon may include natural or artificial graphite that is shapeless, tabular, flake, spherical, or fibrous. Examples of the amorphous carbon may include soft carbon (cold calcined carbon), hard carbon, meso-phase pitch carbide, and calcined coke.

Examples of the conductive material may include carbon black, graphite particulate, natural graphite, artificial graphite, acetylene black, ketjenblack, carbon fiber, carbon nanotubes; a metal powder, fiber, and/or tube of copper, nickel, aluminum, and/or silver; and a conductive polymer, such as a polyphenylene derivative. However, the conductive material is not limited to these materials, and may be any conductive material that is suitable for use in a lithium battery.

Non-limiting examples of the binder may include vinylidene fluoride/hexafluoropropylene copolymer, polyvinylidene fluoride, polyacrylonitrile, polymethyl methacrylate, polytetrafluoroethylene (PTFE), a mixture of these polymers, and a styrene butadiene rubber-based polymer. The solvent may be selected from N-methylpyrrolidone (NMP), acetone, and water. However, the binder and solvent are not limited to these materials, and may be any binder and solvent that are suitable for use in a lithium battery.

The amounts of the anode active material, the conductive material, the binder, and the solvent may be at the same levels as those suitable for use in a lithium battery of the related art.

A cathode may be manufactured in substantially the same manner as used to manufacture the anode, except that a cathode active material is used instead of the anode active material.

An example method of manufacturing a cathode is described below.

As in the method of manufacturing the anode, a cathode active material, a binder, and a solvent are mixed. Optionally, a conductive material may be further used together therewith to prepare the cathode active material composition. The cathode active material composition may be directly coated on an aluminum current collector, thereby completing the manufacture of a cathode. In some embodiments, the cathode active material composition may be cast on a separate support, and then a cathode active material film exfoliated from the separate support may be laminated on an aluminum current collector to manufacture a cathode.

The cathode active material may be any material that is used in the art, and is not particularly limited. For example, a compound that enables the intercalation and deintercalation of lithium ions may be used as the cathode active material. For example, at least one composite oxide of lithium and metal selected from cobalt, manganese, nickel, and a combination thereof may be used as the cathode active material. Examples of such composite oxide may include compounds represented by $Li_aA_{1-b}B'_bD'_2$ (wherein $0.90\le a\le 1.8$ and $0\le b\le 0.5$); $Li_aE_{1-b}B'_bO_{2-c}D'_c$ (wherein $0.90\le a\le 1.8$, $0\le b\le 0.5$, and $0\le c\le 0.05$); $LiE_{2-b}B'_bO_{4-c}D'_c$ (wherein $0\le b\le 0.5$ and $0\le c\le 0.05$); $Li_aNi_{1-b-c}Co_bB'_cD'_\alpha$ (wherein $0.90\le a\le 1.8$, $0\le b\le 0.5$, $0\le c\le 0.05$, and $0<\alpha\le 2$); $Li_aNi_{1-b-c}Co_bB'_cO_{2-\alpha}F_\alpha$ (wherein $0.90\le a\le 1.8$, $0\le b\le 0.5$, $0\le c\le 0.05$, and $0<\alpha<2$); $Li_aNi_{1-b-c}Co_bB'_cO_{2-\alpha}F_2$ (wherein $0.90\le a\le 1.8$, $0\le b\le 0.5$, $0\le c\le 0.05$, and $0<\alpha<2$); $Li_aNi_{1-b-c}Mn_bB'_cD'_\alpha$ (wherein $0.90\le a\le 1.8$, $0\le b\le 0.5$, $0\le c\le 0.05$, and $0<\alpha\le 2$); $Li_aNi_{1-b-c}Mn_bB'_cO_{2-\alpha}F_\alpha$ (wherein $0.90\le a\le 1.8$, $0\le b\le 0.5$, $0\le c\le 0.05$, and $0<\alpha<2$); $Li_aNi_{1-b-c}Mn_bB'_cO_{2-\alpha}F_2$ (wherein $0.90\le a\le 1.8$, $0\le b\le 0.5$, $0\le c\le 0.05$, and $0<\alpha<2$); $Li_aNi_bE_cG_dO_2$ (wherein $0.90\le a\le 1.8$, $0\le b\le 0.9$, $0\le c\le 0.5$, and $0.001\le d\le 0.1$); $Li_aNi_bCo_cMn_dG_eO_2$ (wherein $0.90\le a\le 1.8$, $0\le b\le 0.9$, $0\le c\le 0.5$, $0\le d\le 0.5$, and $0.001\le e\le 0.1$); $Li_aNiG_bO_2$ (wherein $0.90\le a\le 1.8$ and $0.001\le b\le 0.1$); $Li_aCoG_bO_2$ (wherein $0.90\le a\le 1.8$ and $0.001\le b\le 0.1$); $Li_aMnG_bO_2$ (wherein $0.90\le a\le 1.8$ and $0.001\le b\le 0.1$); $Li_aMn_2G_bO_4$ (wherein $0.90\le a\le 1.8$ and $0.001\le b\le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0\le f\le 2$); $Li_{(3-f)}Fe_2(PO_4)_3$ ($0\le f\le 2$); and $LiFePO_4$.

In the formulae above, A may be at least one selected from Ni, Co, and Mn; B' may be at least one selected from Al, Ni, Co, Mn, Cr, Fe, Mg, Sr, V, and the alkali rare-earth materials; D' may be at least one selected from O, F, S, and P; E may be at least one selected from Co and Mn; G may be at least one selected from Al, Cr, Mn, Fe, Mg, La, Ce, Sr, and V; Q may be at least one selected from Ti, Mo, and Mn; I' may be at least one selected from Cr, V, Fe, Sc, and Y; and J may be at least one selected from V, Cr, Mn, Co, Ni, and Cu.

Examples of the cathode active material may include $LiMn_2O_4$, $LiNi_2O_4$, $LiCoO_2$, $LiNiO_2$, $LiMnO_2$, $Li_2MnO_3$, $LiFePO_4$, $LiNi_xCo_yO_2$ ($0<x\le 0.15$ and $0<y\le 0.85$), $LiNi_{x1}Co_{y1}Mn_{z1}O_2$ ($0<x1\le 0.90$, $0<y1\le 0.50$, $0<z1\le 0.50$, and $x_1+y_1+z_1=1$), and $LiNi_pCo_qAl_rO_2$ ($0<p\le 0.90$, $0<q\le 0.15$, $0<r\le 0.15$, and $p+q+r=1$).

In the cathode active material composition, the conductive material, the binder, and the solvent may be substantially the same as those used in the anode. In some embodiments, a plasticizer may be further added to each of the anode active material composition and the cathode active material composition to form pores inside the corresponding electrode plates.

The amounts of the cathode active material, the conductive material, the binder, and the solvent may be at substantially the same levels as those suitable for use in a lithium battery of the related art. Depending on the purpose and structure of the lithium battery, at least one of the conductive material, the binder, and the solvent may be omitted.

A separator, which is to be inserted between the anode and the cathode, is prepared. The separator may be any material that is suitable for use in a lithium battery of the related art.

The separator may have low resistance to migration of electrolyte ions and a high electrolyte solution-retaining capability. For example, the separator may be selected from glass fiber, polyester, Teflon, polyethylene, polypropylene, PTFE and a combination thereof, and may be in a woven- or non-woven form. For example, when used in a lithium ion battery, the separator may be a windable separator including polyethylene, polypropylene, and/or the like. When used in a lithium ion polymer battery, the separator may be a separator having an excellent organic electrolyte solution-retaining capability. A separator may be prepared using the following example method.

A separator composition may be prepared by mixing a polymer resin, a filler, and a solvent. The separator composition may be directly coated and/or dried on an electrode to complete the formation of the separator. In some embodiments, the separator composition may be cast on a separate support, and then a film exfoliated from the separate support may be laminated on an electrode to form the separator.

The polymer resin used in preparing the separator is not particularly limited, and any material that is suitable in the art to be used as a binder for an electrode plate may be used. For example, a vinylidene fluoride/hexafluoropropylene copolymer, polyvinylidene fluoride (PVDF), polyacrylonitrile, polymethyl methacrylate, or a mixture thereof may be used.

Then, an electrolyte may be prepared.

In some embodiments, the electrolyte may be an organic electrolyte solution. In some embodiments, the electrolyte may be solid. For example, the electrolyte may be boron oxide, lithium oxynitride, and/or the like. However, the electrolyte is not limited thereto, and may be any suitable solid electrolyte available in the art. The solid electrolyte may be formed on the anode by, for example, sputtering.

An organic electrolyte solution may be prepared by dissolving a lithium salt in an organic solvent.

The organic solvent may be selected from any suitable solvents that are available in the art. For example, the organic solvent may be selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, dimethylether, and/or combinations or mixtures thereof.

The lithium salt may be selected from any suitable materials that are available in the art. Non-limiting examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, and mixtures thereof.

Figure 8:
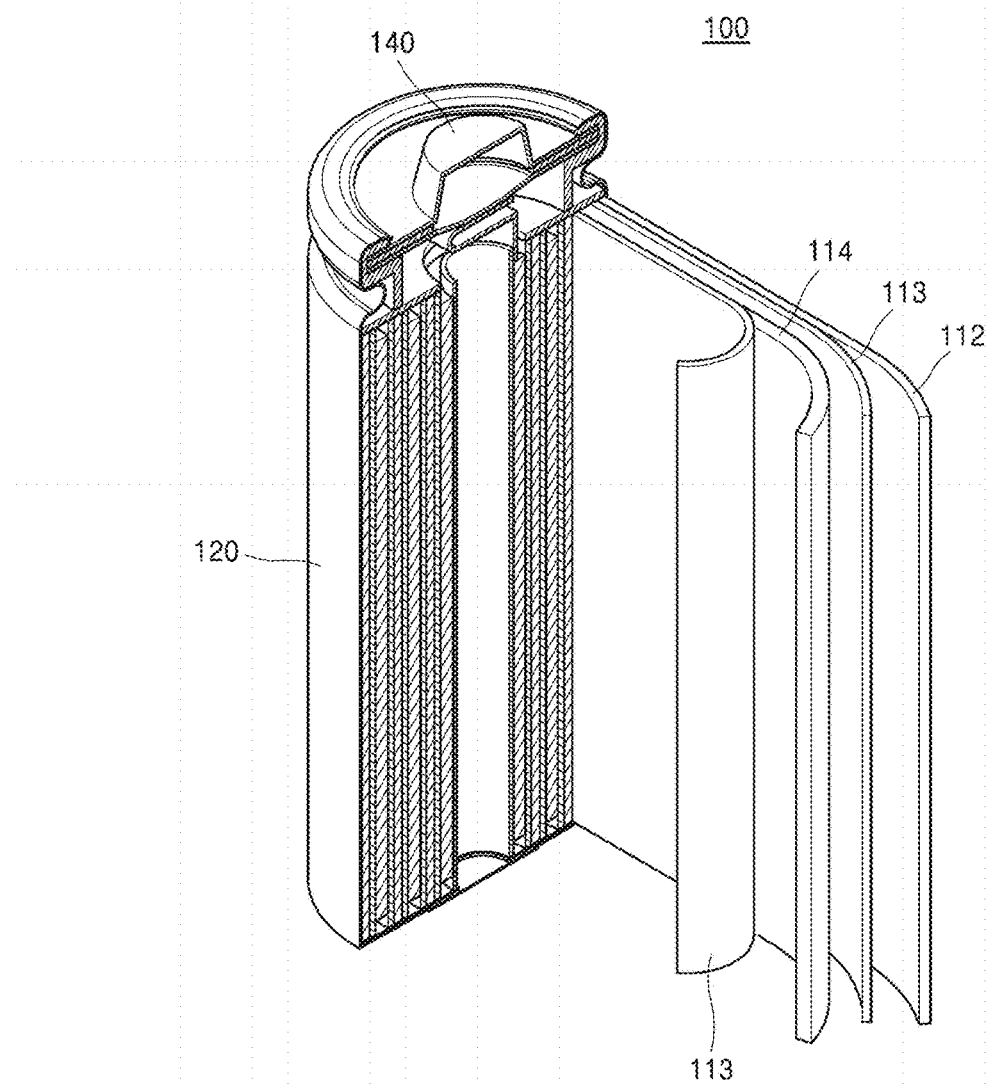
FIG. 8 illustrates an exploded perspective view of a lithium battery according to an example embodiment.

FIG. 8 illustrates an exploded perspective view of a lithium battery 100 according to an example embodiment.

The lithium battery 100 includes a cathode 114, a separator 113, and an anode 112. The cathode 114, the separator 113, and the anode 112 are wound or folded to be accommodated in a battery case 120. Then, an organic electrolyte solution is injected into the battery case 120, which is then sealed with a sealing member 140, thereby completing manufacture of the lithium battery 100. The battery case 120 may be cylindrical, rectangular, or thin-film type (e.g., thin film battery). The lithium battery 100 may be a lithium ion battery or a battery assembly. The battery assemblies may be stacked in a bi-cell structure, and then impregnated with an organic electrolyte solution. The obtained result is housed in a pouch and sealed, thereby completing manufacture of the lithium ion polymer battery. The lithium battery may be used in smartphones, power storage devices, gearing tools, electric vehicles (EVs), or plug-in hybrid electric vehicles (PHEVs). The lithium battery may be used as a unit, and in this case, a plurality of lithium batteries may be stacked on each other to form a battery pack. The lithium battery may be a cylindrical battery, a rectangular battery, a lithium polymer battery, or any other suitable battery.

Another embodiment of the present disclosure provides a method of producing a composite anode active material, the method including preparing a plurality of composite particles; mixing the composite particles and a crystalline carbonaceous material core portion together to obtain a mixture; and drying the mixture to deposit the composite particles on at least a portion of the crystalline carbonaceous material core portion to form a shell portion, wherein each of the composite particles includes a metallic core that is alloyable with lithium, and a coating layer including metal nitride on the surface of the metallic core in an island pattern.

A plurality of composite particles may be prepared. The preparing of the composite particles may include heat-treating a metallic core and a precursor for the metal nitride in a nitrogen or ammonia atmosphere at a temperature of 900° C. to 1300° C.

The precursor of the metallic core and the metal nitride may include at least one selected from $TiSi_2$, $TiSn_2$, $ZrSi_2$, $ZrSn_2$, $Ru_2Si_2$, $Ru_2Si_3$, $RuSn_2$, $PtSn_2$, and $RhSn_2$. For example, the precursor of the metallic core and the metal nitride may include at least one selected from $TiSi_2$, $TiSn_2$, $ZrSi_2$, and $ZrSn_2$.

The heat treating may be performed at a temperature of 900° C. to 1,300° C. for 1 hour to 10 hours in a nitrogen or ammonia atmosphere. For example, the heat treating may be performed at a temperature of 1,000° C. to 1,200° C. for 1 hour to 5 hours in a nitrogen or ammonia atmosphere. Within these heat treatment temperature ranges, composite particles having a desired or suitable structure may be obtained without formation of an intermediate phase or by-products.

Next, the composite particles may be mixed with a crystalline carbonaceous material core portion to obtain a mixture.

The crystalline carbonaceous material core portion may include at least one carbonaceous material selected from artificial graphite, natural graphite, carbon fiber, and MCMB. For example, the crystalline carbonaceous material core portion may be a carbonaceous material having one or more layered-structures obtained from graphite, expansion graphite, or graphene. Obtaining the mixture may include spherizing the crystalline carbonaceous material core portion. The spherizing may be performed using a spherizing device.

Then, the mixture may be dried to deposit the composite particles on at least a portion of the crystalline carbonaceous material core portion to form a shell portion. The drying may be performed using any suitable drying method, for example, spray-drying. Spray-drying is a method of producing dry powder from liquid, fluid, or slurry using heat gas. For example, the spray-drying may be performed at a heat gas temperature of 50° C. to 300° C. at a rate of 1 lpm (liters per minute) for 30 minutes to 2 hours. When spray-drying is used, the metallic core in the composite particles may be formed in a spherical or oval shape.

After the mixture is obtained, the mixture may be pressed to form a plurality of pores in the crystalline carbonaceous material and to allow a plurality of composite particles to be deposited in at least one of the pores.

After the pressing, an amorphous carbonaceous material may be coated on the composite particles. In some embodiments, after a plurality of composite particles are deposited in at least one of the pores, the method may further include coating the amorphous carbonaceous material on the surface of the composite particles. The coating may be performed using any suitable coating method, for example, chemical vapor deposition (CVD).

Hereinafter, example embodiments of the present disclosure will be described below in more detail. However, the examples are presented for illustrative purposes only, and do not limit the scope of the present disclosure.

Some aspects of the examples that should be apparent to one of ordinary skill in the art may not be fully described herein

EXAMPLE

Preparation of Composite Anode Active Material

Example 1: Preparation of Composite Anode Active Material $TiSi_2$ powder (average particle diameter: 1 μm) obtained by pulverizing was placed in a furnace, and heat treated in a nitrogen atmosphere at a temperature of 1100° C. for about 5 hours to prepare a plurality of Si—TiN composite particles. The amount of Si core in the Si—TiN composite particles was 55 parts by weight based on 100 parts by weight of the Si—TiN composite particles.

Graphite (available from BTR Energy Materials Co., average particle diameter: 200 μm) was loaded into a spherizing device (available from Nara Machine Co., NHS), and the spherizing device was driven at a rate of 13,500 rpm for 10 minutes to prepare the spherical graphite core portion.

The Si—TiN composite particles were added to the spherical graphite (available from BTR Energy Materials Co., average particle diameter: 200 μm) core portion at a weight ratio of 40:60, and mixed to obtain a mixture. The mixture was dissolved in 4000 mL of isopropanol, mixed, and then a spraying drier was used to spray-dry the mixed solution at a temperature of about 100° C. to complete the preparation of a composite anode active material including the spherical graphite core and the shell portion including the Si—TiN composite particles on the spherical graphite core.

Example 2: Preparation of Composite Anode Active Material

The result obtained according to Example 1 including the spherical graphite core and the shell portion including the Si—TiN composite particles on the spherical graphite core was subjected to CVD (100% $C_2H_2$, deposition time: 1 h, flow rate: 5 lpm, deposition temperature: 1000° C.) using thermal decomposition with acetylene ($C_2H_2$) as carbon precursor gas, thereby producing a composite anode active material including 20 parts by weight of a pitch coating layer based on 100 parts by weight of the Si—TiN composite particles on the surface of Si—TiN composite particles.

Example 3: Preparation of Composite Anode Active Material

The Si—TiN composite particles of Example 1 were added to the spherical expansion graphite core portion at a weight ratio of 40:60, and then mixed to prepare a mixture.

The spherical expansion graphite core portion was prepared as follows: 100 parts by weight of graphite (sp270, available from Japan graphite) was immersed in a mixed solution of 30 parts by weight of sulfuric acid and acetic acid (1:2 molar ratio of sulfuric acid to acetic acid), mixed for 120 minutes, and then washed by vacuum filtration. The resultant powder was loaded into a spherizing device (available from Nara Machine Co., NHS), and the spherizing device was driven at a rate of 13,500 rpm for 10 minutes.

The mixture was placed in a rotational ball mill, pulverized and mixed at a rate of 500 rpm for 1 hour, and then subjected to a pressure of 40,000 psi to complete the preparation of a composite anode active material in which the expansion graphite core portion has a plurality of pores, and a plurality of Si—TiN composite particles are deposited in the pores and the shell portion.

Example 4: Preparation of Composite Anode Active Material

The Si—TiN composite particles of Example 1 were added to the spherical expansion graphite core portion at a weight ratio of 20:80, and mixed to prepare a mixture.

The spherical expansion graphite core portion was prepared as follows: 100 parts by weight of graphite (sp270, Japan graphite) was immersed in a mixed solution of 30 parts by weight of sulfuric acid and acetic acid (1:2 molar ratio of sulfuric acid to acetic acid), mixed for 120 minutes, and then washed by vacuum filtration. The resultant powder was loaded into a spherizing device (available from Nara Machine Co., NHS), and the spherizing device was driven at a rate of 13,500 rpm for 10 minutes.

The mixture was placed in a rotational ball mill, pulverized and mixed at a rate of 500 rpm for 1 hour, and then subjected to a pressure of 40,000 psi to complete the preparation of a composite anode active material in which the expansion graphite core portion has a plurality of pores, and a plurality of Si—TiN composite particles are deposited in the pores and the shell portion.

Example 5: Preparation of Composite Anode Active Material

The Si—TiN composite particles of Example 1 were added to the spherical expansion graphite core portion at a weight ratio of 40:60, and mixed to prepare a mixture.

The spherical expansion graphite core portion was prepared as follows: 100 parts by weight of graphite (sp270, Japan graphite) was immersed in a mixed solution of 30 parts by weight of sulfuric acid and acetic acid (1:2 molar ratio of sulfuric acid to acetic acid), mixed for 120 minutes, and then washed by vacuum filtration. The resultant powder was loaded into a spherizing device (available from Nara Machine Co., NHS), and the spherizing device was driven at a rate of 13,500 rpm for 10 minutes.

The mixture was loaded into a rotational ball mill, pulverized and mixed at a rate of 500 rpm for one hour to produce a mixture powder, and then subjected to a pressure of 40,000 psi, thereby producing a resultant in which the expansion graphite core portion includes a plurality of pores, and a plurality of Si—TiN composite particles are deposited in the pores and the shell portion. The resultant was subjected to CVD (100% $C_2H_2$, deposition time: 1 h, flow rate: 5 lpm, deposition temperature: 1000° C.) using thermal decomposition with acetylene ($C_2H_2$) as carbon precursor gas to produce 10 parts by weight of a pitch coating layer based on 100 parts by weight of the Si—TiN composite particles on the surface of the Si—TiN composite particles. The other subsequent method was substantially the same as in Example 1.

Example 6: Preparation of Composite Anode Active Material

The Si—TiN composite particles of Example 1 were added to the spherical expansion graphite core portion at a weight ratio of 40:60, and mixed to prepare a mixture.

The spherical expansion graphite core portion was prepared as follows: 100 parts by weight of graphite (sp270, Japan graphite) was immersed in a mixed solution of 30 parts by weight of sulfuric acid and acetic acid (1:2 molar ratio of sulfuric acid to acetic acid), mixed for 120 minutes, and then washed by vacuum filtration. The resultant was loaded into a spherizing device (available from Nara Machine Co., NHS), and the spherizing device was driven at a rate of 13,500 rpm for 10 minutes.

The mixture was loaded into a rotational ball mill, pulverized and mixed at a rate of 500 rpm for one hour to produce a mixture powder, and then subjected to a pressure of 40,000 psi, thereby producing a resultant in which the expansion graphite core portion has a plurality of pores therein, and a plurality of Si—TiN composite particles are deposited in the pores and the shell portion. The resultant was subjected to CVD (100% $C_2H_2$, deposition time: 1 h, flow rate: 5 lpm, deposition temperature: 1000° C.) using thermal decomposition with acetylene ($C_2H_2$) as carbon precursor gas to produce 20 parts by weight of a pitch coating layer based on 100 parts by weight of the Si—TiN composite particles on the surface of the Si—TiN composite particles. The other subsequent method was substantially the same as in Example 1.

Comparative Example 1: Preparation of Anode Active Material

The spherical graphite core portion of Example 1 was used as an anode active material.

Comparative Example 2: Preparation of Anode Active Material

The expansion graphite core portion of Example 2 was used as an anode active material.

Comparative Example 3: Preparation of Anode Active Material

The Si—TiN composite particles of Example 1 were added to the spherical expansion graphite core portion at a weight ratio of 40:60, and mixed to prepare an anode active material.

Comparative Example 4: Preparation of Anode Active Material

The Si—TiN composite particles of Example 1 were added to the spherical expansion graphite core portion at a weight ratio of 20:80, and mixed to prepare an anode active material.

(Manufacture of Lithium Battery)

Example 7: Manufacture of Coin-Format Half Cell

The composite anode active material powder prepared according to Example 1 and styrene-butadiene rubber/carboxymethylcellulose (SBR/CMC, weight ratio of 1.5:1.5) were homogeneously mixed at a weight ratio of 97:3 to prepare an anode active material slurry.

The anode active material slurry was bar-coated on a 10 μm thick copper current collector to a film thickness of 50 to 60 μm. The resulting product was dried for 0.2 hours at a temperature of 100° C., and then vacuum-dried for 6 hours at a temperature of 110° C. to prepare an anode plate. The anode plate was roll-pressed to form an anode sheet for a coin cell. The capacity of the anode was in a range of 3.0 mAh/cm$^2$ to 3.5 mAh/cm$^2$.

The anode was used to manufacture a coin-format half cell (CR2032 format) with a diameter of 20 mm.

In manufacturing the coin-format half cell (CR2032 format), lithium metal was used as a counter electrode, and a solution prepared by dissolving 1.1M LiPF$_6$ and 0.2M LiBF$_4$ in a mixed solvent including ethylene carbonate (EC): diethyl carbonate (DEC):fluoroethylene carbonate (FEC) (in a volumetric ratio of 2:6:2) was used as an electrolyte.

Examples 8 to 12: Manufacture of Coin-Format Half Cells

Coin-format half cells (CR2032 format) were prepared in substantially the same manner as in Example 7, except that the composite anode active material powder prepared according to Examples 2 to 6 was used instead of the composite anode active material powder prepared according to Example 1.

Comparative Examples 5 to 8: Manufacture of Coin-Format Half Cells

Coin-format half cells (CR2032 format) were prepared in substantially the same manner as in Example 7, except that the composite anode active material powder prepared according to Comparative Examples 1 to 4 was used instead of the composite anode active material powder prepared according to Example 1.

Analytical Example 1: SEM Image

The composite anode active materials manufactured according to Examples 2 and 3 were imaged by an SEM (available from Hitachi, S-5500) at 2000×, 5000×, and 5000× magnification. The results are shown in FIGS. 4A, 4B, and 5.

Figure 4A:
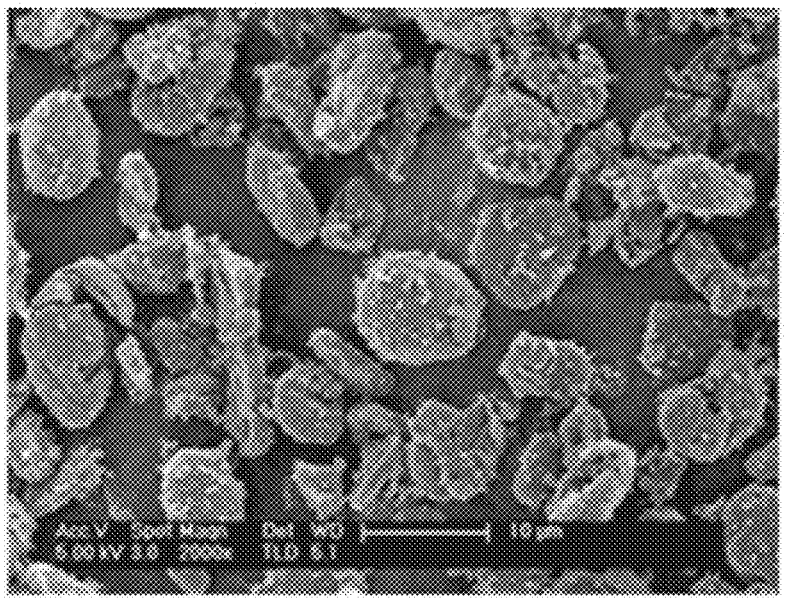
FIGS. 4A and 4B show scanning electron microscope (SEM) photographs of a composite anode active material prepared according to Example 2 at 2,000× and 5,000× magnification, respectively.
Figure 4B:
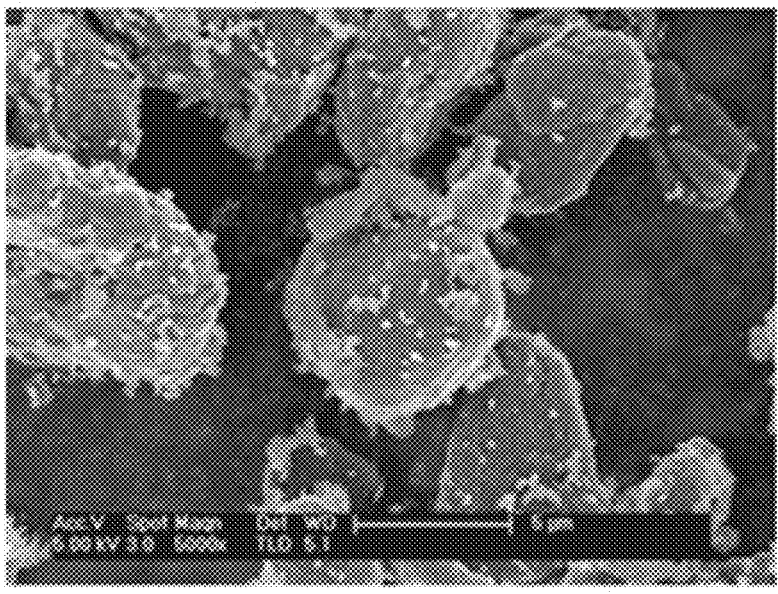

As shown in FIGS. 4A and 4B showing the composite anode active material of Example 2, a plurality of composite particles are deposited on a spherical or oval carbonaceous core portion particle, thereby forming the shell portion.

Figure 5:
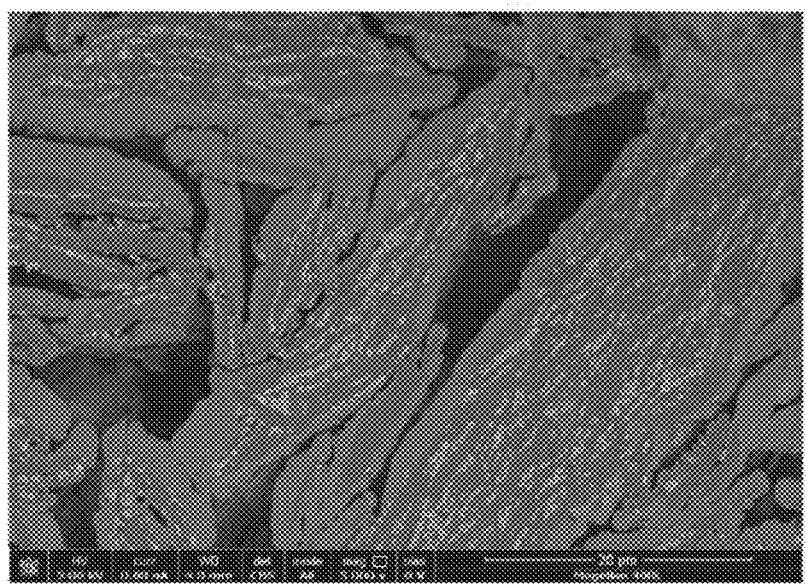
FIG. 5 shows an SEM photograph of the carbonaceous core portion of a composite anode active material prepared according to Example 3 at 5,000× magnification.
Figure 6A:
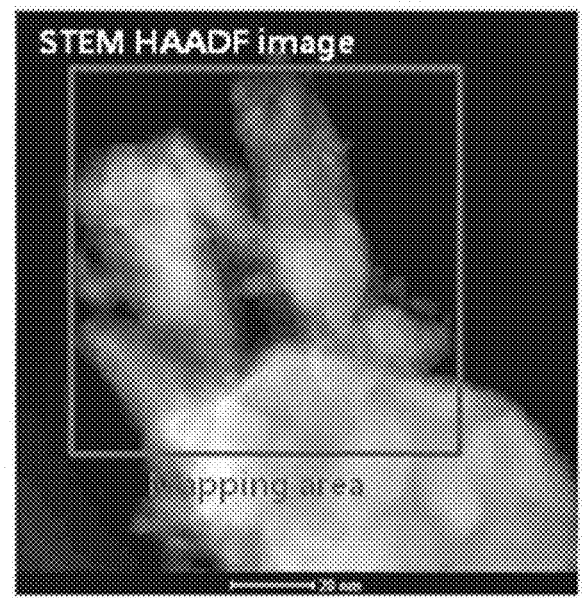
FIG. 6A shows a high angle annular dark field-scanning transmission electron microscope (HAADF-STEM) photograph of the composite anode active material of Example 2.
Figure 6B:
FIGS. 6B to 6D show elemental distribution mapping photographs of nitrogen, silicon, and titanium elements, respectively, in the red square region of FIG. 6A.
Figure 6C:
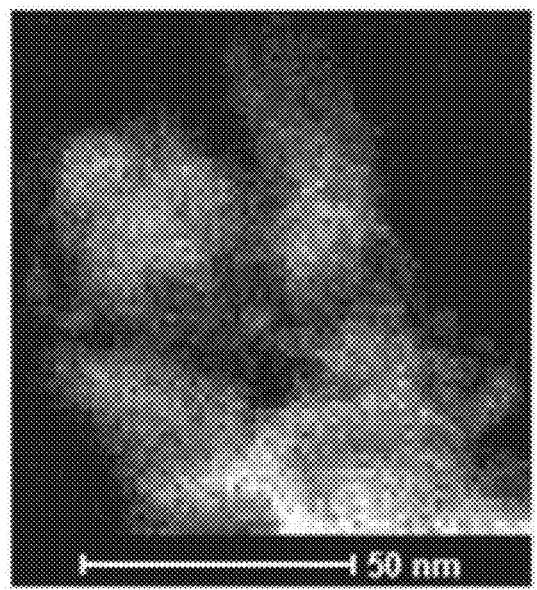
Figure 6D:

As shown in FIG. 5 showing the composite anode active material of Example 3, the carbonaceous core portion has a plurality of pores formed by widened interlayer intervals of a carbonaceous material.

Analytical Example 2: High Angle Annular Dark Field-Scanning Transmission Electron Microscopy (HAADF-STEM) Image The composite anode active material prepared according to Example 2 was imaged and analyzed by high angle annular dark field-scanning transmission electron microscopy (HAADF-STEM) (TECNAI F30, FEI company), and the weight ratios of components included in the composite anode active material were calculated. The results are shown in FIGS. 6A to 6D and Table 1.

TABLE 1

|  | Si/TiN (parts by weight) | Si (parts by weight) | Ti (parts by weight) | N (parts by weight) |
| --- | --- | --- | --- | --- |
| Example 2 | 100 | 55 | 35 | 10 |

As shown in FIGS. 6A to 6D showing the composite anode active material of Example 2 and elemental distribution mappings, it is seen that Si is distributed on the carbonaceous core portion, and Ti and N are distributed on the Si.

Referring to Table 1, it is seen that the composite anode active material of Example 2 includes, based on 100 parts by weight of the core-shell structure of Si/TiN composite particles, 55 parts by weight of Si, 35 parts by weight of Ti, and 10 parts by weight of N.

Evaluation Example 1: Evaluation of Volume Expansion Ratio of Anode

The coin-format half cells manufactured according to Example 9, Example 10, Comparative Example 7, and Comparative Example 8 were charged at a rate of 0.1 C, and then the coin-format half cells were disassembled. The thicknesses of the anode plate were compared before and after charging to measure a volume expansion ratio. The results are shown in Table 2.

TABLE 2

|  | Volume expansion ratio (%) |
| --- | --- |
| Example 9 | 31.2 |
| Example 10 | 29.7 |
| Comparative Example 7 | 34.6 |
| Comparative Example 8 | 32.1 |

Referring to Table 2, the volume expansion ratios of the anode plates of the coin-format half cells of Examples 9 and 10 were lower than the volume expansion ratios of the anode plates of the coin-format half cells of Comparative Examples 7 and 8.

Evaluation Example 2: Charging and Discharging Characteristics Evaluation—Initial Efficiency, Charge and Discharge Capacity, and Lifespan Characteristics Evaluation The charging and discharging characteristics of the coin-format half cells of Example 9 and Comparative Example 7 were evaluated in the following manner.

The coin-format half cells of Example 9 and Comparative Example 7 were charged at room temperature at a rate of 0.1 C until the anode voltage reached 0.1 V (vs. Li$^+$/Li), and then discharged with a constant current at a rate of 0.1 C until the voltage reached a cut-off voltage of 1.5 V. In this regard, the charge capacities and the discharge capacities (charge capacity and discharge capacity at $1^{st}$ cycle) of the coin-format half cells were measured. Initial efficiencies were calculated using the obtained capacity values in Equation 1.

Initial efficiency (%)=[(discharge capacity at $1^{st}$ cycle)/(charge capacity at $1^{st}$ cycle)]×100   Equation 1

The cells were charged at rate of 0.5 C in substantially the same manner as described above, and then discharged at a rate of 0.5 C until the voltage reached 1.5 V. In this regard, the charge capacity and the discharge capacity of the cells upon extended cycling were measured. The charging and discharging cycles were repeatedly performed and the discharge capacity was measured at the $80^{th}$ cycle.

Lifespan characteristics were evaluated by calculating the capacity retention rate (%) according to Equation 2. The results are shown in Table 3 and FIG. 7A.

Capacity retention rate (%)=[(discharge capacity at $80^{th}$ cycle)/(discharge capacity at $1^{st}$ cycle)]×100   Equation 2

TABLE 3

|  | Charge capacity at $1^{st}$ cycle (mAh/g) | Discharge capacity at $1^{st}$ cycle (mAh/g) | Initial efficiency (%) | Capacity retention ratio (%) |
| --- | --- | --- | --- | --- |
| Example 9 | 481 | 441 | 91.7 | 90 |
| Comparative Example 7 | 479 | 438 | 91.4 | 85.6 |

Figure 7A:
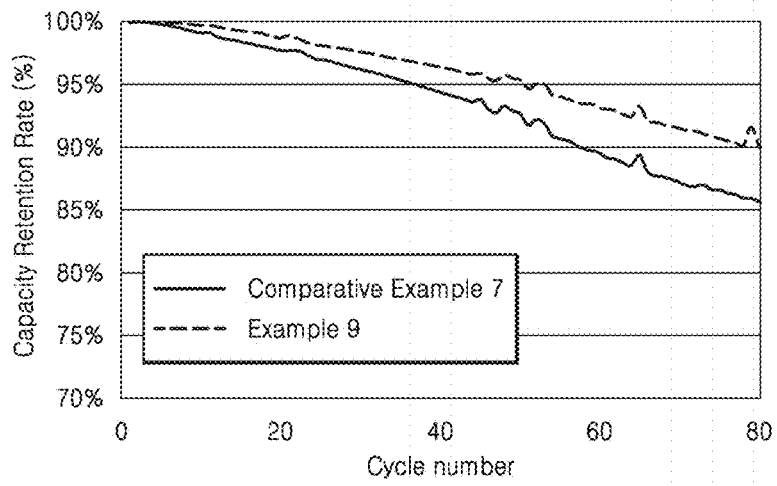
FIG. 7A illustrates a graph of the capacity retention rate of lithium batteries manufactured according to Example 9 and Comparative Example 7 up to the $80^{th}$ cycle.

Referring to Table 3 and FIG. 7A, the coin-format half cell of Example 9 shows better performance than the coin-format half cell of Comparative Example 7 in terms of the charge capacity at the $1^{st}$ cycle, the discharge capacity at the $1^{st}$ cycle, initial efficiency, and the capacity retention rate.

The charging and discharging characteristics evaluation was performed on the coin-format half cells of Example 10 and Comparative Example 8 to evaluate the charge capacity at the $1^{st}$ cycle and discharge capacity at the $1^{st}$ cycle in substantially the same manner as described above. Regarding lifespan characteristics in Equation 2, the discharge capacity at the $15^{th}$ cycle was used instead of the discharge capacity at the $80^{th}$ cycle. The results are shown in Table 4 and FIG. 7B.

TABLE 4

|  | Charge capacity in $1^{st}$ cycle (mAh/g) | Discharge capacity in $1^{st}$ cycle (mAh/g) | Initial efficiency (%) | Capacity retention ratio (%) |
| --- | --- | --- | --- | --- |
| Example 10 | 426 | 393 | 92.3 | 99.5 |
| Comparative Example 8 | 420 | 385 | 91.6 | 99.0 |

Figure 7B:
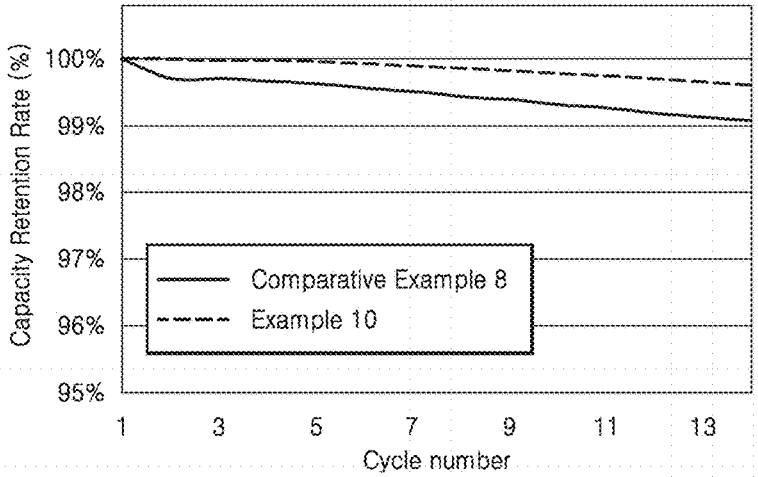
FIG. 7B illustrates a graph of the capacity retention rate of lithium batteries manufactured according to Example 10 and Comparative Example 8 up to the $15^{th}$ cycle.

Referring to Table 4 and FIG. 7B, the coin-format half cell of Example 10 shows better performance than the coin-format half cell of Comparative Example 8 in terms of the charge capacity at the $1^{st}$ cycle, the discharge capacity at the $1^{st}$ cycle, initial efficiency, and the capacity retention rate.

The charging and discharging characteristics evaluation was performed on the coin-format half cells of Example 9 and Example 12 to evaluate the charge capacity at the $1^{st}$ cycle and the discharge capacity at the $1^{st}$ cycle in substantially the same manner as described above. Regarding lifespan characteristics in Equation 2, the discharge capacity at the $30^{th}$ cycle was used instead of the discharge capacity at the $80^{th}$ cycle. The results are shown in Table 5 and FIG. 7C.

TABLE 5

| | Charge capacity at $1^{st}$ cycle (mAh/g) | Discharge capacity at $1^{st}$ cycle (mAh/g) | Initial efficiency (%) | Capacity retention ratio (%) |
|---|---|---|---|---|
| Example 9 | 481 | 441 | 91.7 | 97.6 |
| Example 12 | 387 | 351 | 90.7 | 98.3 |

Figure 7C:
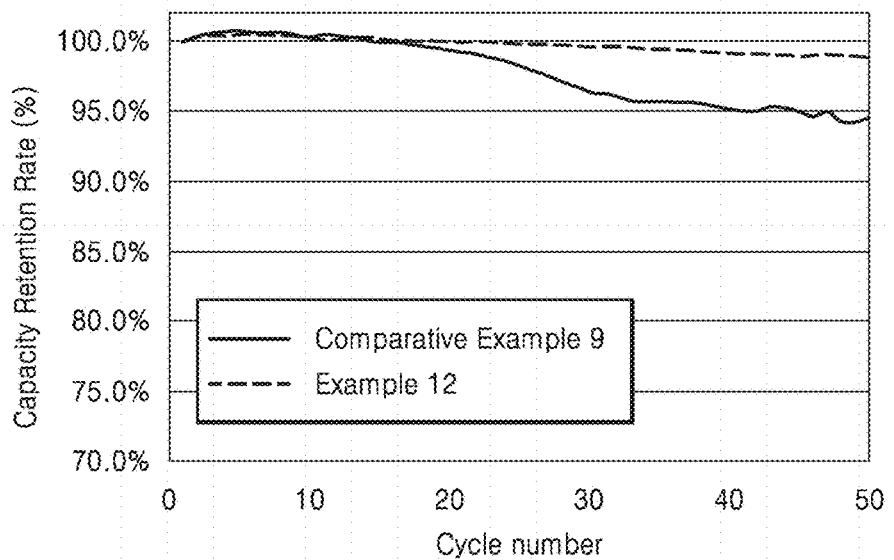
FIG. 7C illustrates a graph of the capacity retention rate of lithium batteries manufactured according to Example 9 and Comparative Example 12 up to the $50^{th}$ cycle.

Referring to Table 5 and FIG. 7C, the coin-format half cell of Example 9 shows better performance than the coin-format half cell of Example 12 in terms of the charge capacity at the $1^{st}$ cycle, the discharge capacity at the $1^{st}$ cycle, and initial efficiency. The coin-format half cell of Example 12 has a higher capacity retention rate than the coin-format half cell of Example 9. Through these experiments, it is seen that a composite anode active material including a pitch coating layer has a longer lifespan than a composite anode active material that does not include a pitch coating layer.

In one embodiment, a lithium battery including the composite anode active material including: a core portion including a crystalline carbonaceous material; and a shell portion including a plurality of composite particles on at least a portion of the core portion, wherein each of the composite particles includes a metallic core that is alloyable with lithium; and a coating layer including metal nitride on the surface of the metallic core in an island pattern, may have improved initial efficiency, charge and discharge capacity, and lifespan characteristics.

As used herein, the use of "may" when describing embodiments of the present disclosure refers to "one or more embodiments of the present disclosure". In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the drawings, it will be understood by those of ordinary skill in the art that various changes in form and details may be made therein without departing from the spirit and scope as defined by the following claims and equivalents thereof.

What is claimed is:

1. A composite anode active material comprising:
    a core portion comprising a crystalline carbonaceous material; and
    a shell portion comprising a plurality of composite particles on at least a portion of the core portion, and an amorphous carbonaceous coating layer on the surface of the composite particles,
    wherein each of the composite particles comprises:
    a metallic core that is alloyable with lithium; and
    a coating layer comprising metal nitride on a surface of the metallic core in an island pattern.

2. The composite anode active material of claim 1, wherein the metallic core is spherical or oval.

3. The composite anode active material of claim 1, wherein an average particle diameter of the metallic core is in a range of about 1 μm to about 10 μm.

4. The composite anode active material of claim 1, wherein the metallic core comprises at least one selected from silicon, tin, germanium, antimony, aluminum, lead, gallium, indium, cadmium, silver, mercury, and zinc.

5. The composite anode active material of claim 1, wherein an amount of the metallic core is in a range of about 10 parts by weight to about 60 parts by weight based on 100 parts by weight of the composite particles.

6. The composite anode active material of claim 1, wherein the metal nitride comprises at least one nitride selected from titanium, vanadium, scandium, chromium, manganese, iron, nickel, cobalt, yttrium, zirconium, niobium, molybdenum, ruthenium, rhodium, tantalum, palladium, tungsten, osmium, iridium, gold, and platinum.

7. The composite anode active material of claim 1, wherein the core portion comprises at least one crystalline carbonaceous material selected from artificial graphite, natural graphite, carbon fiber, and mesocarbon microbeads (MCMB).

8. The composite anode active material of claim 1, wherein the core portion has a plurality of pores in the crystalline carbonaceous material.

9. The composite anode active material of claim 8, wherein the composite particles are in at least one of the pores.

10. The composite anode active material of claim 1, wherein a weight ratio of the core portion including the crystalline carbonaceous material to the composite particles in the composite anode active material is in a range of about 60:40 to about 80:20.

11. The composite anode active material of claim 1, wherein an amount of the amorphous carbonaceous coating layer is in a range of about 2 parts by weight to about 40 parts by weight based on about 100 parts by weight of the composite particles.

12. A lithium battery comprising:
    a cathode comprising a cathode active material;
    an anode comprising the composite anode active material of claim 1; and
    an electrolyte between the cathode and the anode.

* * * * *